(12) United States Patent
Tanahashi et al.

(10) Patent No.: US 11,577,719 B2
(45) Date of Patent: Feb. 14, 2023

(54) AUTONOMOUS DRIVING CONTROL APPARATUS AND AUTONOMOUS DRIVING CONTROL METHOD FOR VEHICLE

(71) Applicant: DENSO CORPORATION, Kariya (JP)

(72) Inventors: Akihito Tanahashi, Kariya (JP); Kazuyoshi Isaji, Kariya (JP)

(73) Assignee: DENSO CORPORATION, Kariya (JP)

( * ) Notice: Subject to any disclaimer, the term of this patent is extended or adjusted under 35 U.S.C. 154(b) by 64 days.

(21) Appl. No.: 16/854,546

(22) Filed: Apr. 21, 2020

(65) Prior Publication Data

US 2020/0247399 A1  Aug. 6, 2020

Related U.S. Application Data

(63) Continuation of application No. PCT/JP2018/031972, filed on Aug. 29, 2018.

(30) Foreign Application Priority Data

Oct. 23, 2017  (JP) .............................. JP2017-204356

(51) Int. Cl.
*B60W 30/09* (2012.01)
*B60W 60/00* (2020.01)
(Continued)

(52) U.S. Cl.
CPC ............ *B60W 30/09* (2013.01); *B60W 10/20* (2013.01); *B60W 30/0956* (2013.01);
(Continued)

(58) Field of Classification Search
CPC .. B60W 30/09; B60W 60/0016; B60W 10/20; B60W 30/0956; B60W 2552/00; G05D 1/0214; G08G 1/166; G08G 1/167
See application file for complete search history.

(56) References Cited

U.S. PATENT DOCUMENTS

| 5,332,057 A | 7/1994 | Butsuen et al. |
| 2010/0217476 A1* | 8/2010 | Kindo ................. G05D 1/0088 701/31.4 |

(Continued)

FOREIGN PATENT DOCUMENTS

| JP | H05-058319 A | 3/1993 |
| JP | 2006-515699 A | 6/2006 |

(Continued)

*Primary Examiner* — Abby Y Lin
*Assistant Examiner* — Danielle Marie Jackson
(74) *Attorney, Agent, or Firm* — Maschoff Brennan

(57) ABSTRACT

An autonomous driving control apparatus installable in a vehicle includes a path determining section, an obstacle determining section that determines whether an obstacle on the planned driving path is a passage acceptable obstacle or a passage unacceptable obstacle, the passage acceptable obstacle being previously set as an obstacle that the vehicle is allowed to come into contact with while passing, the passage unacceptable obstacle being previously set as an obstacle that the vehicle is not allowed to come into contact with while passing, and a control instructing section that gives an instruction of control to a maneuver controller to perform at least one of controlling a speed of the vehicle and controlling a steering of the vehicle to control a maneuver of the vehicle. If the obstacle is determined to be the passage acceptable obstacle, the control instructing section gives an instruction of the control to pass over the obstacle.

7 Claims, 15 Drawing Sheets

(51) Int. Cl.
  *B60W 10/20* (2006.01)
  *B60W 30/095* (2012.01)
  *G05D 1/02* (2020.01)
  *G08G 1/16* (2006.01)

(52) U.S. Cl.
  CPC ....... *B60W 60/0016* (2020.02); *G05D 1/0214* (2013.01); *G08G 1/166* (2013.01); *B60W 2552/00* (2020.02); *G05D 2201/0213* (2013.01)

(56) References Cited

U.S. PATENT DOCUMENTS

| | | | |
|---|---|---|---|
| 2011/0137527 A1 | 6/2011 | Simon et al. | |
| 2015/0175159 A1* | 6/2015 | Gussner | B60W 10/18 701/1 |
| 2017/0168503 A1* | 6/2017 | Amla | G05D 1/0011 |
| 2018/0032078 A1* | 2/2018 | Ferguson | G06V 20/58 |
| 2020/0103907 A1* | 4/2020 | Kaji | B60W 30/095 |

FOREIGN PATENT DOCUMENTS

| | | | |
|---|---|---|---|
| JP | 2008-108219 A | | 5/2008 |
| JP | 2008108219 A | * | 5/2008 |
| JP | 2009-214764 A | | 9/2009 |
| JP | 2011-46344 A | | 3/2011 |
| JP | 2016-132273 A | | 7/2016 |
| JP | 2017-033542 A | | 2/2017 |

\* cited by examiner

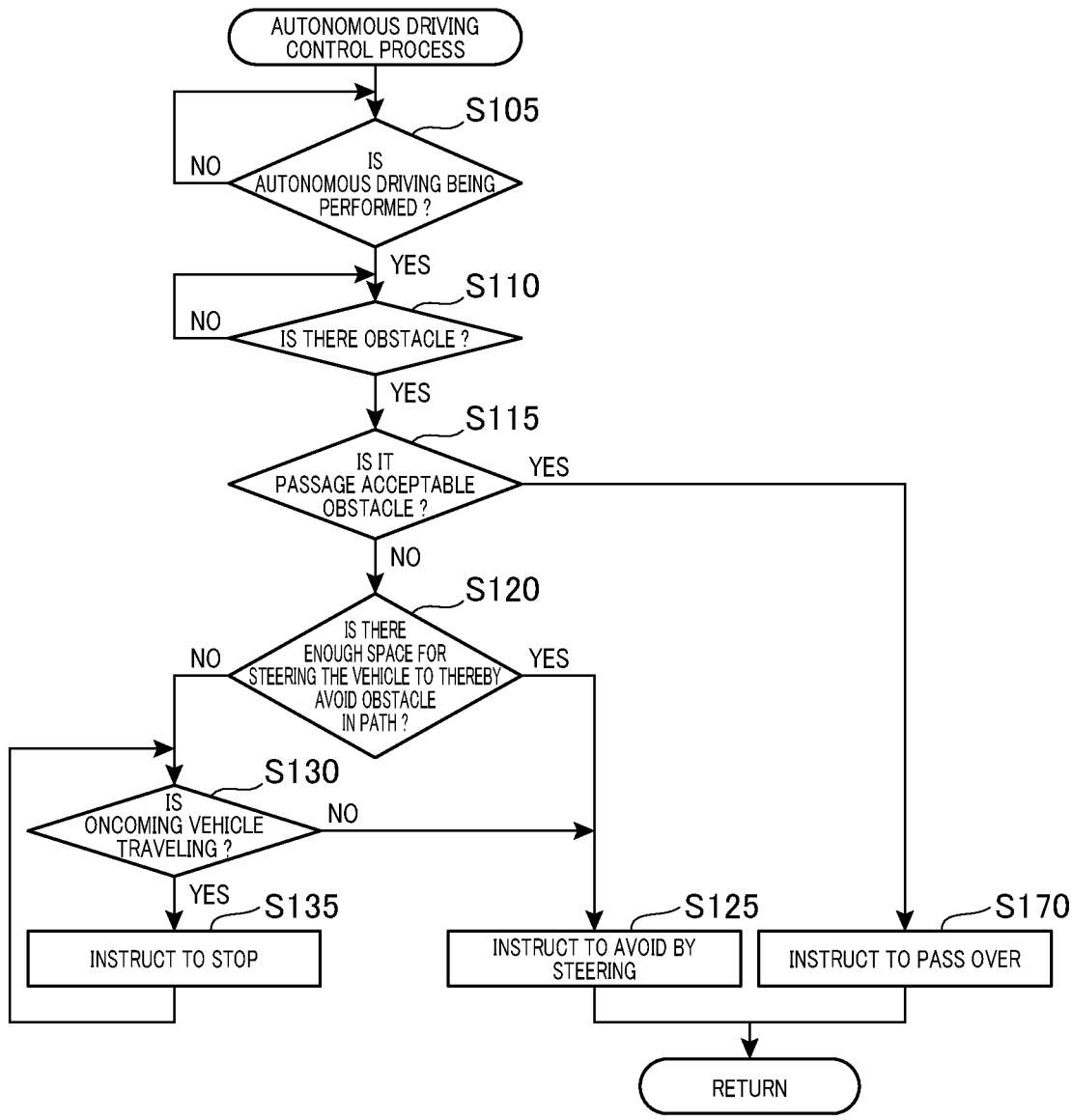

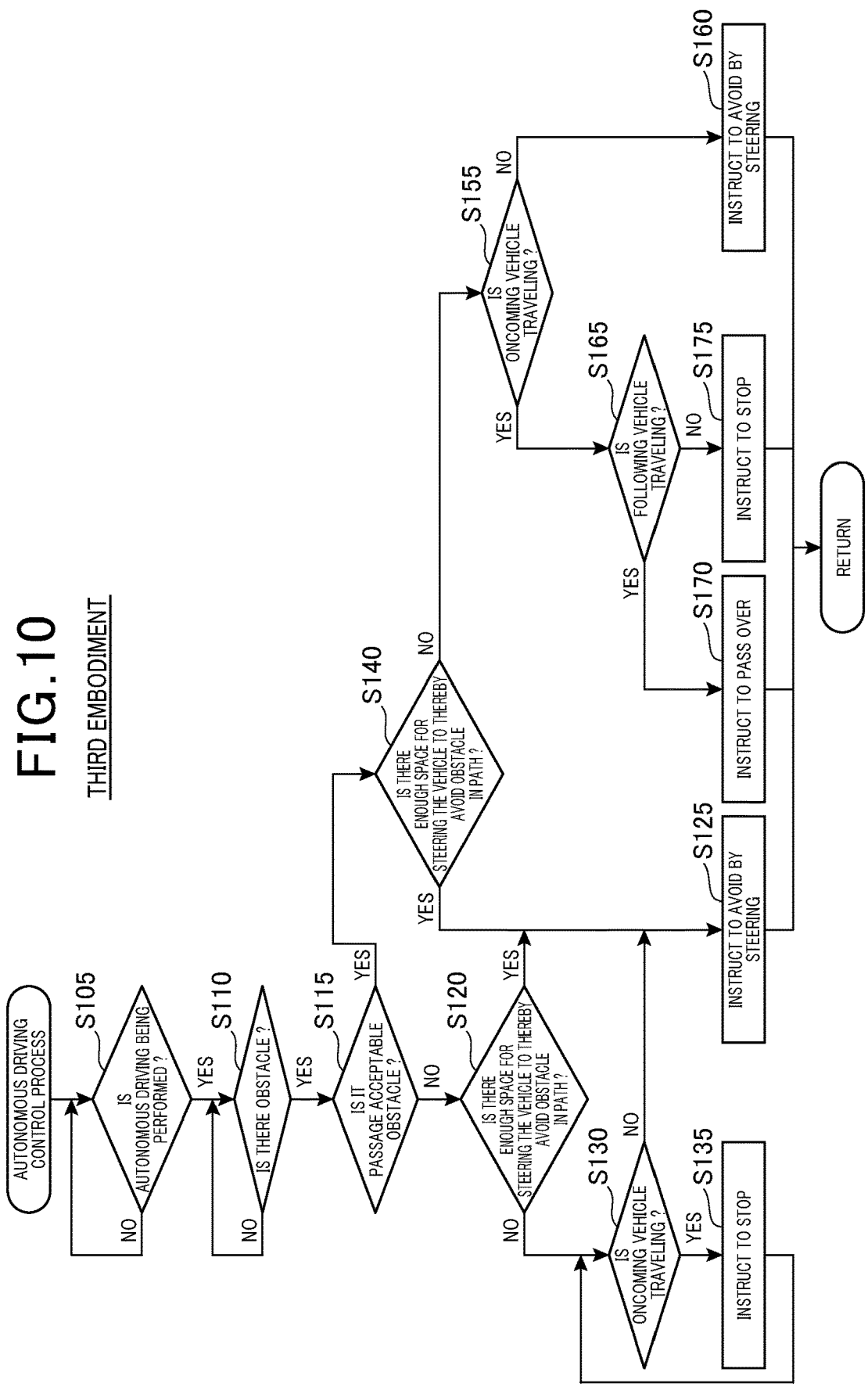

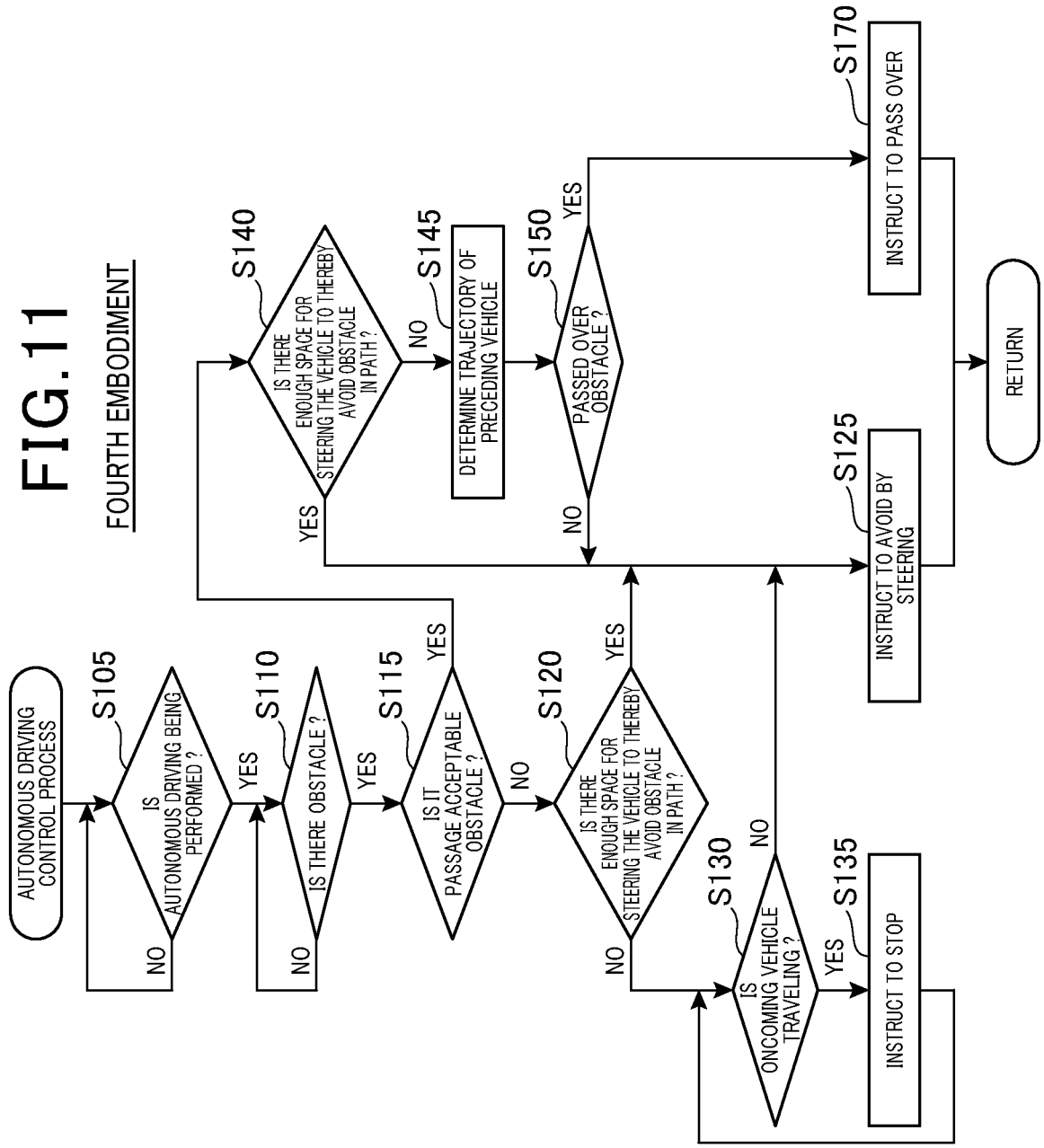

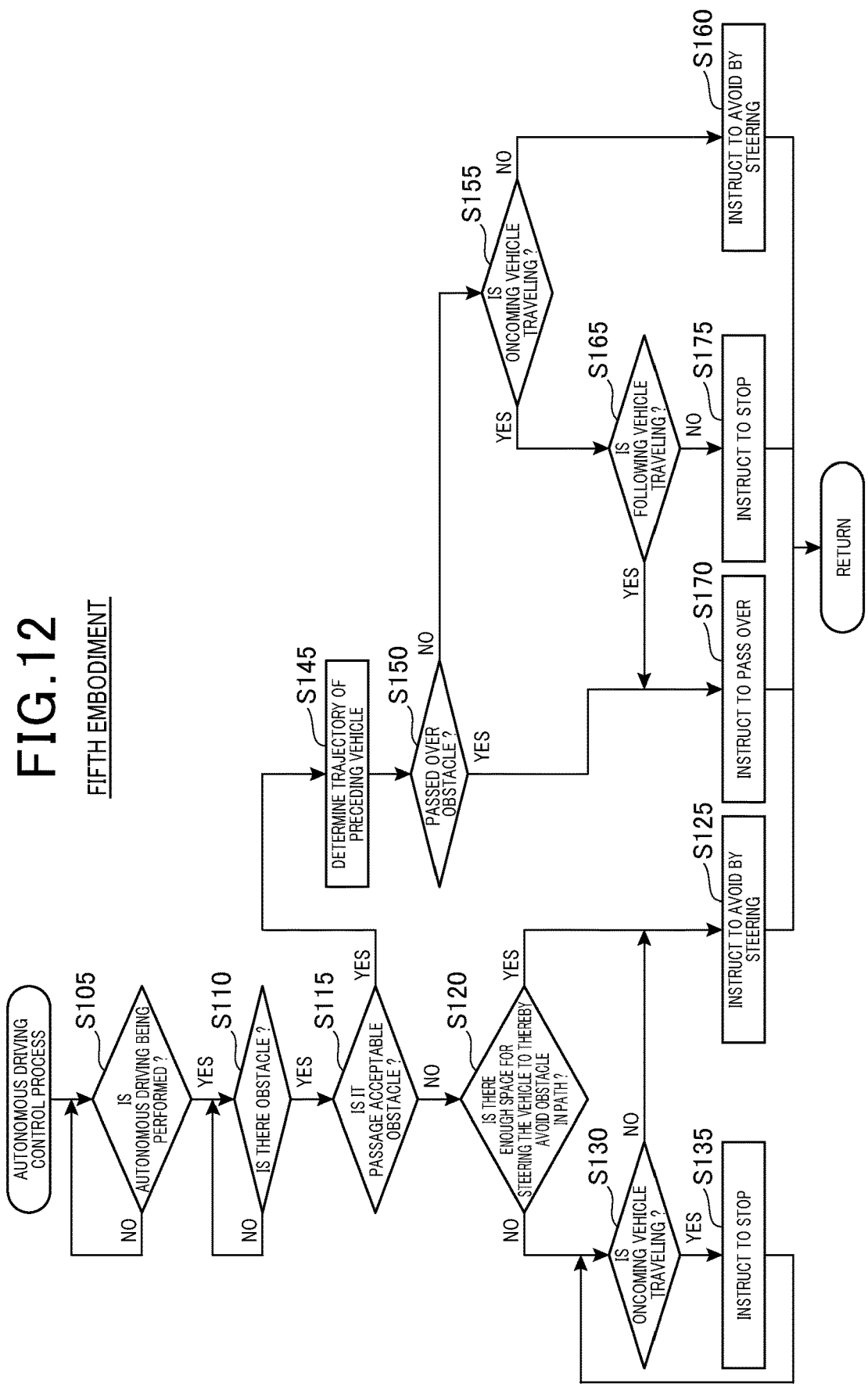

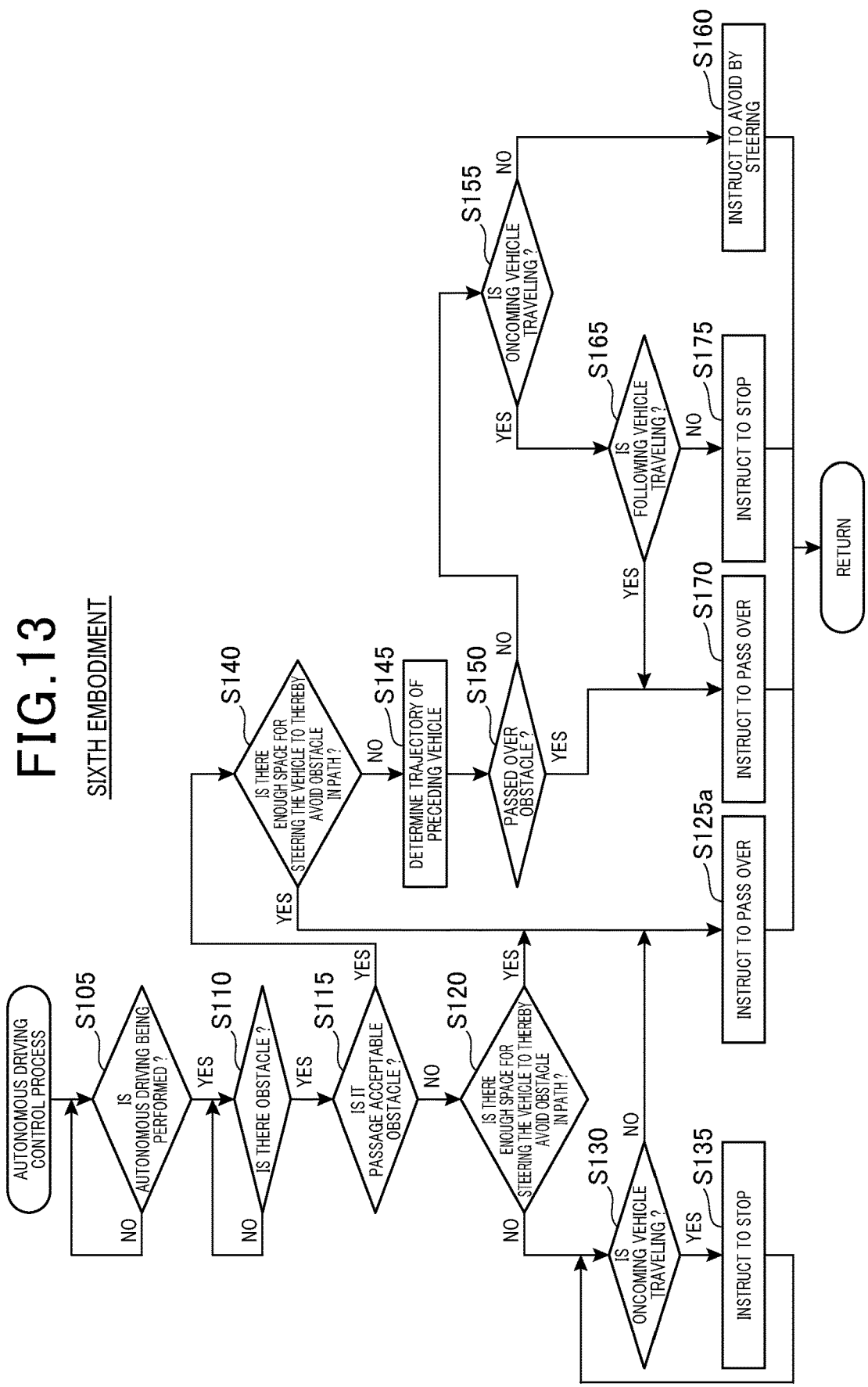

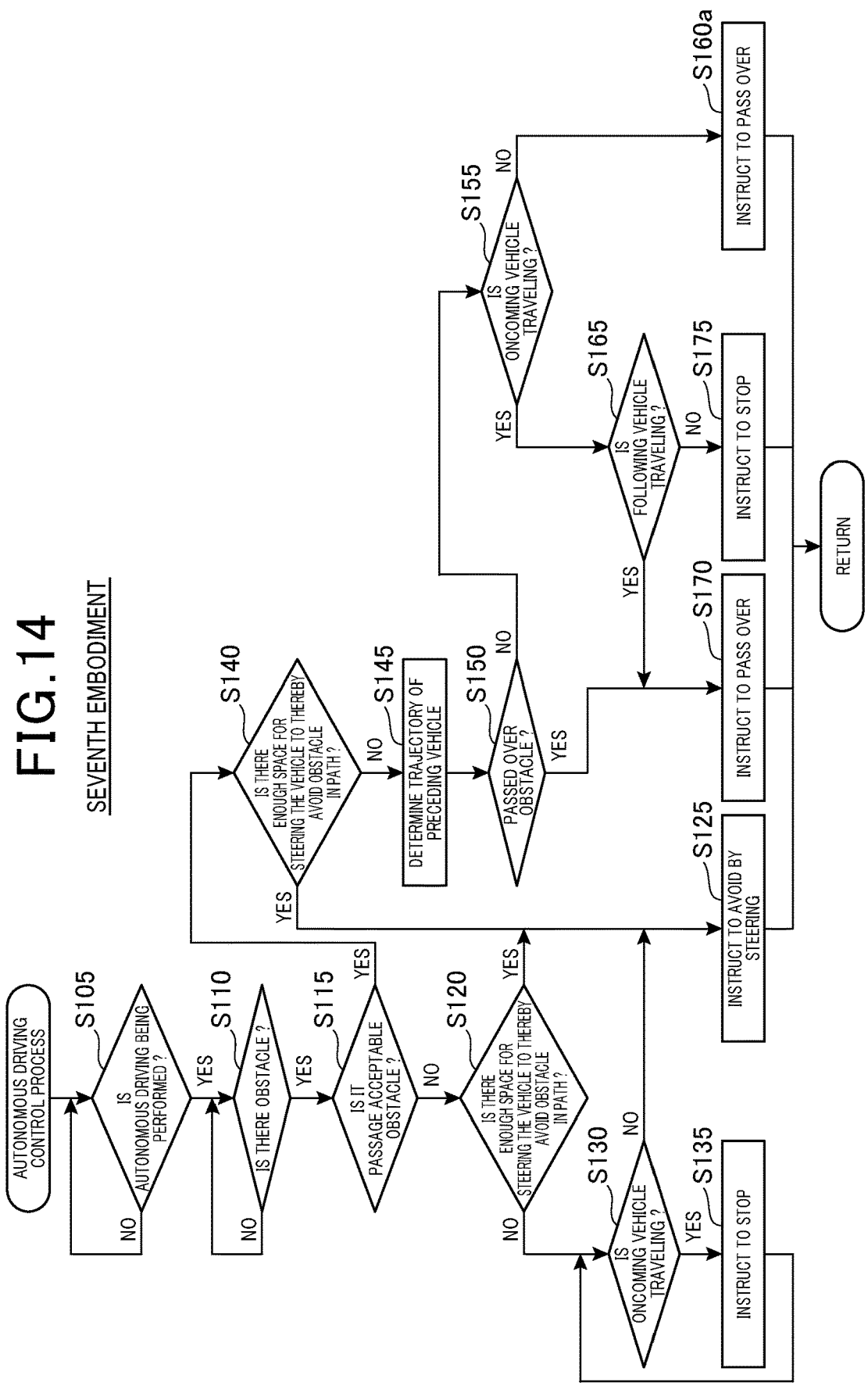

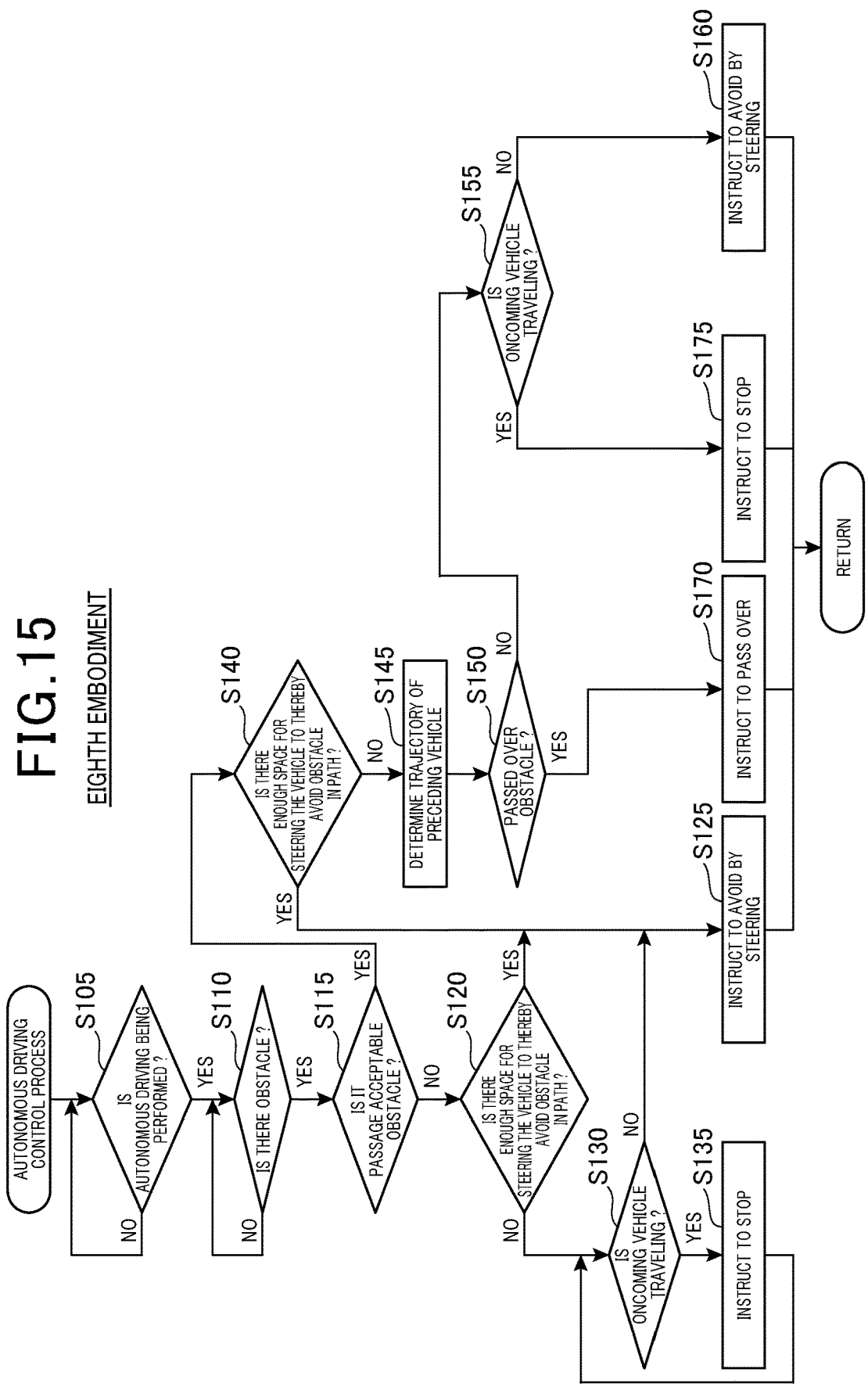
FIG.15 EIGHTH EMBODIMENT

AUTONOMOUS DRIVING CONTROL APPARATUS AND AUTONOMOUS DRIVING CONTROL METHOD FOR VEHICLE

CROSS-REFERENCE TO RELATED APPLICATION

The present application is a continuation application of International Application No. PCT/JP2018/031972, filed on Aug. 29, 2018, which claims priority to Japanese Patent Application No. 2017-204356, filed on Oct. 23, 2017. The contents of these applications are incorporated herein by reference in their entirety.

BACKGROUND

Technical Field

The present disclosure relates to an autonomous driving control for a vehicle.

Background Art

Various autonomous driving control technologies have been proposed that detect an obstacle on a planned driving path of a vehicle and automatically steer to avoid the obstacle. For example, a technology is proposed that uses images captured by cameras mounted on the own vehicle and the detection results of a millimeter-wave radar that is also mounted on the own vehicle to detect the obstacle on the path and predict contact between the obstacle and the own vehicle. If any contact is predicted, the own vehicle is automatically steered or decelerated to avoid the obstacle.

SUMMARY

In the present disclosure, provided is an autonomous driving control apparatus as the following. The autonomous driving control apparatus includes a traffic condition determining section and a control instruction section. The traffic condition determining section determines a traffic condition surrounding a vehicle, the traffic condition including: whether an oncoming vehicle is traveling on an oncoming lane that is opposite to a lane of a planned driving path on which the vehicle is traveling; and whether there is enough space for steering the vehicle to thereby avoid an obstacle on the lane of the planned driving path. The control instruction section gives an instruction of control to a maneuver controller to perform at least one of controlling a speed of the vehicle and controlling a steering of the vehicle to thereby pass over the obstacle upon: the obstacle on the planned driving path being a passage acceptable obstacle, and the traffic condition satisfying, as a predetermined condition, both a first condition that an oncoming vehicle is traveling on the oncoming lane, and a second condition that is no enough space.

BRIEF DESCRIPTION OF THE DRAWINGS

The above-mentioned and other objects, features, and advantages of the present disclosure will become more apparent by reference to the following description taken in conjunction with the accompanying drawings, in which:

FIG. 9 is a flowchart showing the routine of an autonomous driving control process according to a second embodiment;

FIG. 10 is a flowchart showing the routine of an autonomous driving control process according to a third embodiment;

FIG. 11 is a flowchart showing the routine of an autonomous driving control process according to a fourth embodiment;

FIG. 12 is a flowchart showing the routine of an autonomous driving control process according to a fifth embodiment;

FIG. 13 is a flowchart showing the routine of an autonomous driving control process according to a sixth embodiment;

FIG. 14 is a flowchart showing the routine of an autonomous driving control process according to a seventh embodiment; and FIG. 15 is a flowchart showing the routine of an autonomous driving control process according to an eighth embodiment.

DETAILED DESCRIPTION OF THE PREFERRED EMBODIMENTS

Figure 1:
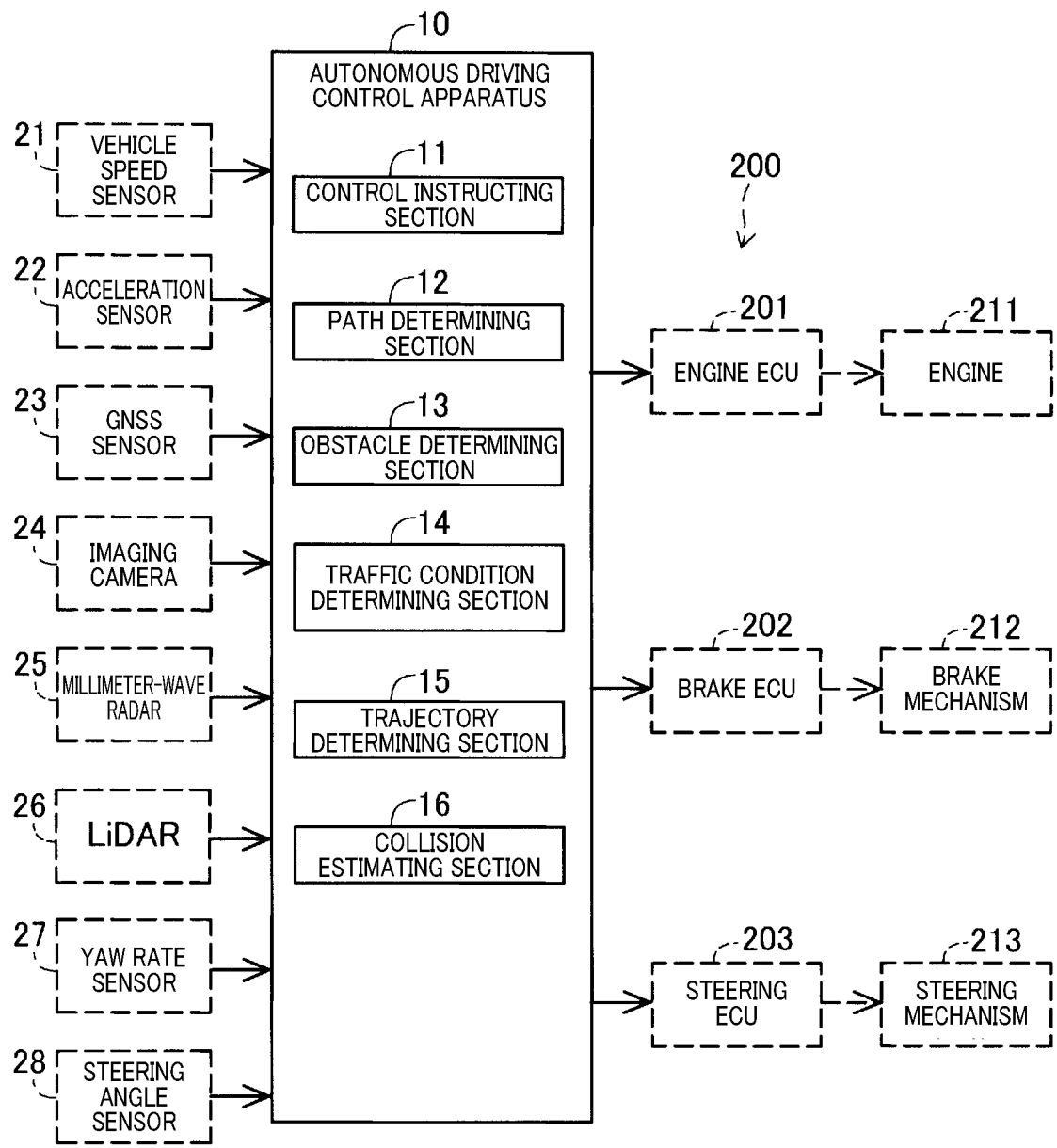
FIG. 1 is a block diagram illustrating the configuration of an autonomous driving control apparatus according to one embodiment of the present invention.

[PTL 1] Japanese Patent Application Publication No. H05-58319

The obstacle on the path includes, besides the obstacles that must be avoided such as pedestrians, bicycles, and motorbikes, the kinds of obstacles that allow the vehicle to pass as the obstacle. For example, a puddle, leaves of plants that extend into the path from a road shoulder, and soil and sand moved from the road shoulder onto the path by, for example, wind may allow the vehicle to pass since the influence is small even if the vehicle comes into contact. However, in PTL 1, if contact is predicted, steering is executed to avoid the obstacle even if the obstacle is such kind of obstacle that allows the vehicle to pass. Thus, the steering may possibly cause an occupant to feel uncomfortable. Additionally, the steering may possibly influence the surrounding traffic, for example, causing the oncoming vehicle to steer or apply brakes because of the own vehicle approaching the oncoming vehicle or causing the following vehicle to apply brakes. Thus, the technology is desired that limits the influence on the occupant and the surrounding traffic when the vehicle travels beyond the obstacle on the path.

The present invention is intended to solve at least one of the above problems and may be embodied in the following forms.

According to a first aspect of the present invention, an autonomous driving control apparatus installable in a vehicle, comprising:

a path determining section that determines a planned driving path of the vehicle;

an obstacle determining section that determines whether an obstacle on the planned driving path is a passage acceptable obstacle or a passage unacceptable obstacle, the passage acceptable obstacle being previously set as an obstacle that the vehicle is allowed to come into contact with while passing, the passage unacceptable obstacle being previously set as an obstacle that the vehicle is not allowed to come into contact with while passing;

a traffic condition determining section that determines a traffic condition surrounding the vehicle, the traffic condition including:

whether an oncoming vehicle is traveling on an oncoming lane that is opposite to a lane of the planned driving path on which the vehicle is traveling; and whether there is enough space for steering the vehicle to thereby avoid the obstacle on the lane of the planned driving path; and a control instruction section that gives an instruction of control to a maneuver controller to perform at least one of controlling a speed of the vehicle and controlling a steering of the vehicle to thereby pass over the obstacle upon:

the obstacle on the planned driving path being a passage acceptable obstacle the traffic condition satisfying, as a predetermined condition, both a first condition that an oncoming vehicle is traveling on the oncoming lane, and a second condition that is no enough space.

According to the autonomous driving control apparatus of this aspect, if it is determined that the obstacle on the planned driving path is a passage acceptable obstacle, the control instructing section gives an instruction of the control to pass the obstacle. It is possible to inhibit the avoidance maneuver from being performed although the obstacle is the kind of obstacle that has a small influence even if the vehicle comes into contact while passing, and thus to inhibit the influence on the occupant and the surrounding traffic when the vehicle travels beyond the obstacle on the path.

The present invention may be achieved in various forms other than the autonomous driving control apparatus. For example, the present invention may be achieved by an autonomous driving control method for a vehicle, a computer program for achieving the method, and a storing medium that stores the computer program.

A. First Embodiment

A1. Structure of Apparatus

An autonomous driving control apparatus 10 according to a first embodiment shown in FIG. 1 is installed in a vehicle and controls autonomous driving of the vehicle. In the present embodiment, the vehicle in which the autonomous driving control apparatus 10 is installed will sometimes be referred to as the own vehicle. In the present embodiment, the autonomous driving control apparatus 10 is constituted by an Electronic Control Unit (ECU) including a microcomputer and a memory. In the present embodiment, the own vehicle is a vehicle equipped with an engine. The own vehicle is a vehicle that is capable of selectively executing autonomous driving and manual driving. A driver can switch between the autonomous driving and the manual driving by a predetermined switch provided on, for example, an instrument panel. The autonomous driving refers to the driving mode in which engine control, brake control, and steering control are all automatically executed without the driver performing any driving operations. The manual driving refers to the driving mode in which the operation for the engine control (depressing an accelerator pedal), the operation for the brake control (depressing a brake pedal), and the operation for the steering control (rotation of a steering wheel) are executed by the driver.

The autonomous driving control apparatus 10 is electrically connected to a vehicle speed sensor 21, an acceleration sensor 22, a Global Navigation Satellite System (GNSS) sensor 23, an imaging camera 24, a millimeter-wave radar 25, a LiDAR (Light Detection and Ranging, or Laser Imaging Detection and Ranging) 26, a yaw rate sensor 27, and a steering angle sensor 28. The autonomous driving control apparatus 10 acquires respective measurement values obtained by the corresponding one of the sensors and gives an instruction of control to a maneuver controller 200 in accordance with the measurement values.

The vehicle speed sensor 21 detects the speed of the own vehicle. The acceleration sensor 22 detects the acceleration of the own vehicle. The GNSS sensor 23 is constituted by, for example, the Global Positioning System (GPS) sensor and detects the current position of the own vehicle on the basis of the radio waves received from artificial satellites constituting the GPS. The imaging camera 24 is facing the outside of the own vehicle and acquires images. The imaging camera 24 may be a monocular camera. Alternatively, a stereo camera or a multi-camera constituted by two or more cameras may be used. The millimeter-wave radar 25 detects, using radio waves in a millimeter-wave band, the existence of an object around the own vehicle, the distance between the object and the own vehicle, the position of the object, the size of the object, the shape of the object, and the speed of the object relative to the own vehicle. The object detected by the millimeter-wave radar 25 is, more accurately, a group of detection points (target object). The LiDAR 26 detects, for example, the existence of objects around the own vehicle using a laser. The yaw rate sensor 27 detects the yaw rate (rotational angle speed) of the own vehicle. The steering angle sensor 28 detects the steering wheel angle of the own vehicle.

The maneuver controller 200 is a functional unit, which controls the maneuver of the own vehicle. In the present embodiment, the maneuver controller 200 includes an engine ECU 201, a brake ECU 202, and a steering ECU 203. The engine ECU 201 controls the operation of an engine 211. More specifically, the engine ECU 201 controls the opening and closing operation of a throttle valve, the ignition of an igniter, the opening and closing operation of intake valves, and the like, by controlling various non-illustrated actuators. The brake ECU 202 controls a brake mechanism 212. The brake mechanism 212 includes devices (actuators) related to the brake control such as sensors, motors, valves, and pumps. The brake ECU 202 determines the timing to apply brakes and the braking amount and controls the devices constituting the brake mechanism 212 so that the determined braking amount is achieved at the determined timing. The steering ECU 203 controls a steering mechanism 213. The steering mechanism 213 includes devices (actuators) related to steering such as a power steering motor. The steering ECU 203 determines the steering amount (steering angle) in accordance with the measurement values obtained from the yaw rate sensor 27 and the steering angle sensor 28, and controls the devices constituting the steering mechanism 213 to achieve the determined steering amount.

The autonomous driving control apparatus 10 includes a control instructing section 11, a path determining section 12, an obstacle determining section 13, a traffic condition determining section 14, a trajectory determining section 15, and a collision estimating section 16. The functional units 11 to 16 are achieved by a non-illustrated microcomputer of the autonomous driving control apparatus 10 executing control programs previously stored in a non-illustrated memory of the autonomous driving control apparatus 10.

The control instructing section 11 gives an instruction of control to the maneuver controller 200. The path determining section 12 determines a planned driving path. The planned driving path refers to the path that the own vehicle is planning to travel. In the present embodiment, the determination of the planned driving path is made as follows. The path determining section 12 first determines the lane on which the own vehicle is currently traveling on the basis of the target object detected by the millimeter-wave radar 25 and the LiDAR 26 and the images captured by the imaging camera 24. Subsequently, the path determining section 12 determines whether the own vehicle is going to change the lane on the basis of the detection results of the yaw rate sensor 27 and the steering angle sensor 28. If it is determined that the lane is not going to be changed, the path determining section 12 determines that the lane on which the own vehicle is currently traveling is the planned driving path. In contrast, if it is determined that the lane is going to be changed, the path determining section 12 determines that the lane after the lane change is the planned driving path. The path determining section 12 periodically executes the determination of the planned driving path. For example, the determination may be made every hundreds of milliseconds.

The obstacle determining section 13 determines whether an obstacle is on the planned driving path and determines whether the obstacle is a passage acceptable obstacle or a passage unacceptable obstacle. Whether an obstacle is on the planned driving path is determined on the basis of the target object detected by the millimeter-wave radar 25 and the LiDAR 26 and the image captured by the imaging camera 24. The passage acceptable obstacle refers to the kinds of obstacles that are previously set as the obstacle that the own vehicle may come into contact while passing. The term "passing" means that the own vehicle travels so as to cover at least part of the obstacle. Such kinds of obstacles include, for example, a puddle, overgrown vegetation on a road shoulder and a center divider, and earth and sand from the road shoulder and the center divider. Objects that are intentionally located on the road in advance and are supposed to come into contact while a vehicle passes, such as manholes, do not correspond to the passage acceptable obstacles in the present embodiment. Additionally, those that are intentionally drawn on the road, such as the white lines (zebra pattern) of a crossing and the white line of a stop sign, and are supposed to come into contact while a vehicle passes do not correspond to the passage acceptable obstacles in the present embodiment. The passage unacceptable obstacle refers to the kinds of obstacles that are previously set as the obstacle that the own vehicle must not come into contact while passing. In the present embodiment, the specific kinds of the passage acceptable obstacles are previously set in the autonomous driving control apparatus 10. The passage unacceptable obstacle is set as every kind of obstacle other than the passage acceptable obstacle. Alternatively, the specific kinds of the passage unacceptable obstacle may be set. The obstacle determining section 13 performs pattern matching of comparing with prepared patterns on the basis of the shape and the size of the obstacle determined from the detection results of the millimeter-wave radar 25 and the LiDAR 26 and the image of the obstacle included in the image captured by the imaging camera 24 to determine whether the obstacle is the passage acceptable obstacle or the passage unacceptable obstacle. The patterns (templates) for the pattern matching are previously stored in the non-illustrated memory of the autonomous driving control apparatus 10. Instead of the pattern matching, the obstacle determining section 13 may determine whether the obstacle is the passage acceptable obstacle or the passage unacceptable obstacle by artificial intelligence using a learning algorithm such as deep learning.

The traffic condition determining section 14 determines the traffic condition surrounding the own vehicle. In the present embodiment, the traffic condition surrounding the own vehicle includes whether an oncoming vehicle is traveling, whether a following vehicle is traveling, and whether there is enough space for steering the vehicle to thereby avoid the obstacle on the lane of the planned driving path. Whether an oncoming vehicle is traveling means whether a vehicle is traveling in a predetermined range ahead of the own vehicle on the opposite lane. Similarly, whether a following vehicle is traveling means whether a vehicle is traveling in a predetermined range behind the own vehicle in the driving lane of the own vehicle. Whether an oncoming vehicle is traveling, whether a following vehicle is traveling, and whether there is enough space for steering the vehicle to thereby avoid the obstacle on the lane of the planned driving path, are determined on the basis of the shape and the size of the obstacle determined from the detection results of the millimeter-wave radar 25 and the LiDAR 26, the image of the obstacle included in the image captured by the imaging camera 24, and the planned driving path determined by the path determining section 12.

The trajectory determining section 15 determines the trajectory of a preceding vehicle of the own vehicle. The trajectory of the preceding vehicle is determined on the basis of the shape and the size of the obstacle determined from the detection results of the millimeter-wave radar 25 and the LiDAR 26, the image of the obstacle included in the image captured by the imaging camera 24, and the planned driving path determined by the path determining section 12.

The collision estimating section 16 predicts whether a collision will occur between the own vehicle and the obstacle using the planned driving path determined by the path determining section 12, whether an obstacle is on the planned driving path and the kind of the obstacle determined by the obstacle determining section 13, the surrounding traffic condition determined by the traffic condition determining section 14, and moreover the measurement values obtained from the sensors 21 to 28.

In the autonomous driving control apparatus 10 configured as described above, by executing an autonomous driving control process which will be discussed below, when an obstacle is detected on the planned driving path, the autonomous driving control apparatus 10 controls the maneuver of the own vehicle in accordance with the kind of the obstacle and the surrounding traffic condition, and when the vehicle travels beyond the obstacle on the planned driving path, the influence on an occupant and the surrounding traffic is suppressed. The phrase "travels beyond the obstacle" refers to a wide concept including, in addition to passing over the obstacle, the vehicle passing on the left or right side of the obstacle on the planned driving path without passing over the obstacle, thus overtaking the obstacle.

A2. Autonomous Driving Control Process

Figure 2:
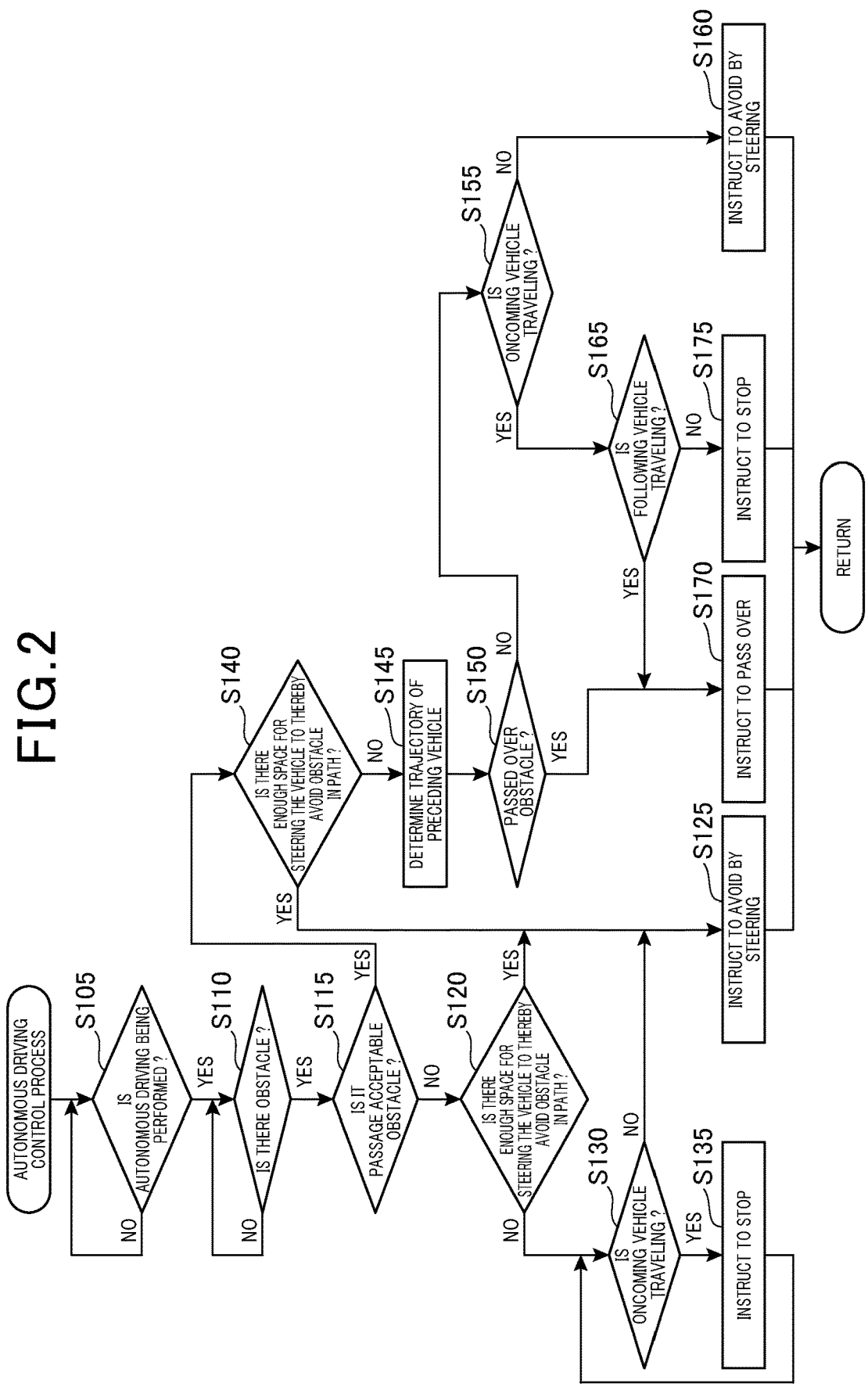
FIG. 2 is a flowchart showing the routine of an autonomous driving control process according to a first embodiment.

When the ignition of the own vehicle is turned ON, or when the start button of the own vehicle is pressed, the autonomous driving control apparatus 10 executes the autonomous driving control process shown in FIG. 2. The obstacle determining section 13 determines whether the autonomous driving is being performed (step S105). If it is determined that the autonomous driving is not being performed, that is, if it is determined that the manual driving is being performed (step S105: NO), step S105 is executed again. In contrast, if it is determined that the autonomous driving is being performed (step S105: YES), the obstacle determining section 13 determines whether there is an obstacle on the planned driving path (step S110). The determination refers to, more specifically, the determination of whether there is an obstacle on the planned driving path in the range of a predetermined distance from the current position of the own vehicle determined by the GNSS sensor 23. The predetermined distance may be the distance previously set in accordance with the vehicle speed of the own vehicle determined by the vehicle speed sensor 21. Alternatively, the predetermined distance may be a constant value regardless of the vehicle speed of the own vehicle. For example, the predetermined distance may be a fixed value of 100 meters. If it is determined that there is no obstacle on the planned driving path (step S110: NO), step S110 is executed again.

If it is determined that there is an obstacle on the planned driving path (step S110: YES), the obstacle determining section 13 determines whether the detected obstacle is the passage acceptable obstacle (step S115). If it is determined that the obstacle is not the passage acceptable obstacle (step S115: NO), the traffic condition determining section 14 determines whether there is enough space for steering the vehicle to thereby avoid the obstacle on the lane of the planned driving path (step S120).

Figure 3:
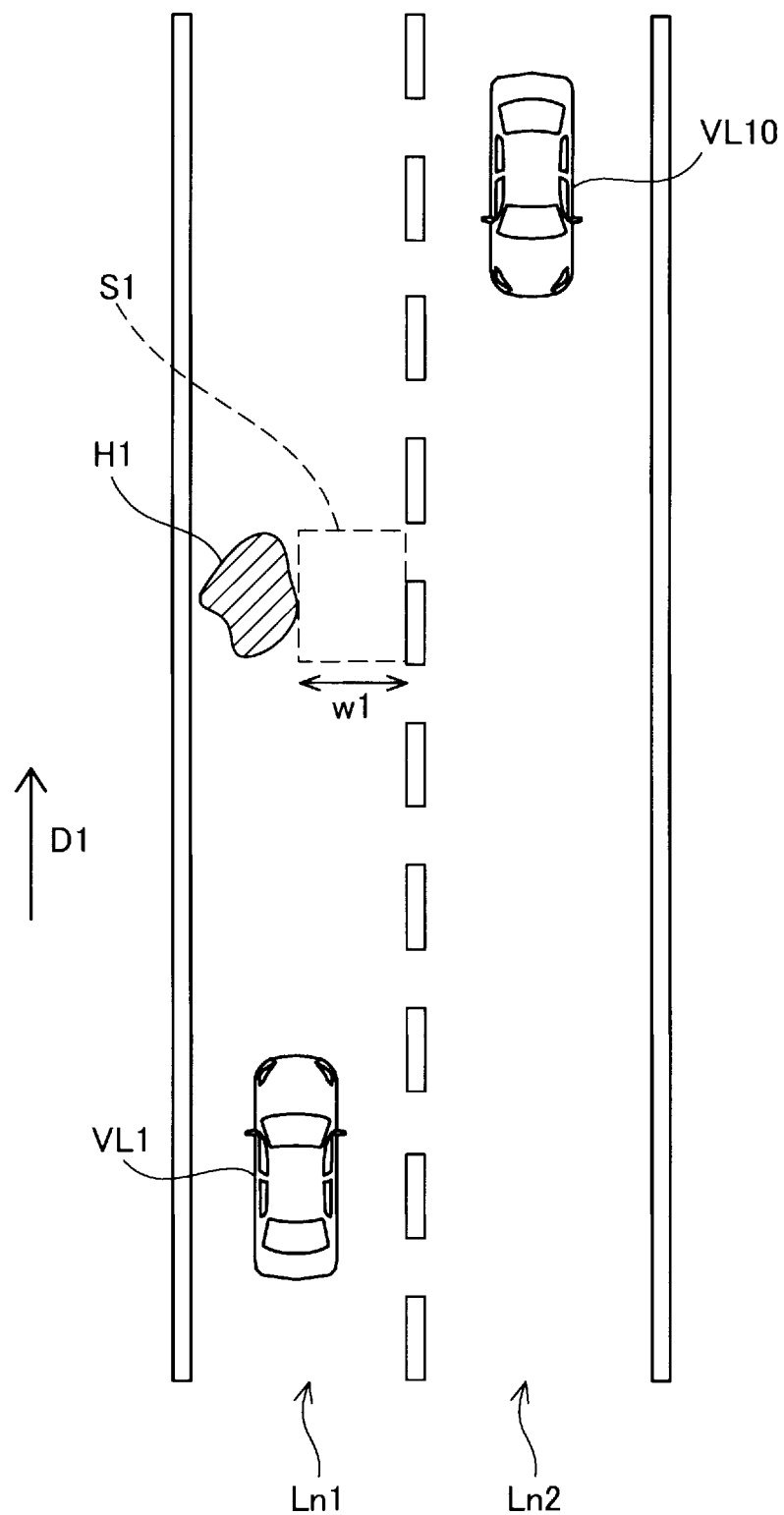
FIG. 3 is an explanatory diagram illustrating an example of the manner in which the own vehicle travels.

FIG. 3 shows a state in which an own vehicle VL1 is traveling straight in a lane Ln1 in a direction D1. In this state, if there is a puddle H1 ahead in the planned driving path, that is, in the lane Ln1, the traffic condition determining section 14 determines whether a length w1 of a space S1 in the direction orthogonal to the direction D1 next to the puddle H1 within the lane Ln1 is greater than the width of the own vehicle VL1. If the length w1 is greater than the width of the own vehicle VL1, it is determined that there is enough space for steering the vehicle to thereby avoid the obstacle. In the example of FIG. 3, there is an oncoming vehicle VL10 ahead in the direction D1 on an opposite lane Ln2.

If it is determined that there is enough space for steering the vehicle to thereby avoid the obstacle (step S120: YES), the control instructing section 11 instructs the maneuver controller 200 to steer the vehicle to thereby avoid the detected obstacle (step S125). Thus, in this case, the own vehicle overtakes the obstacle to thereby avoid obstacle.

Figure 4:
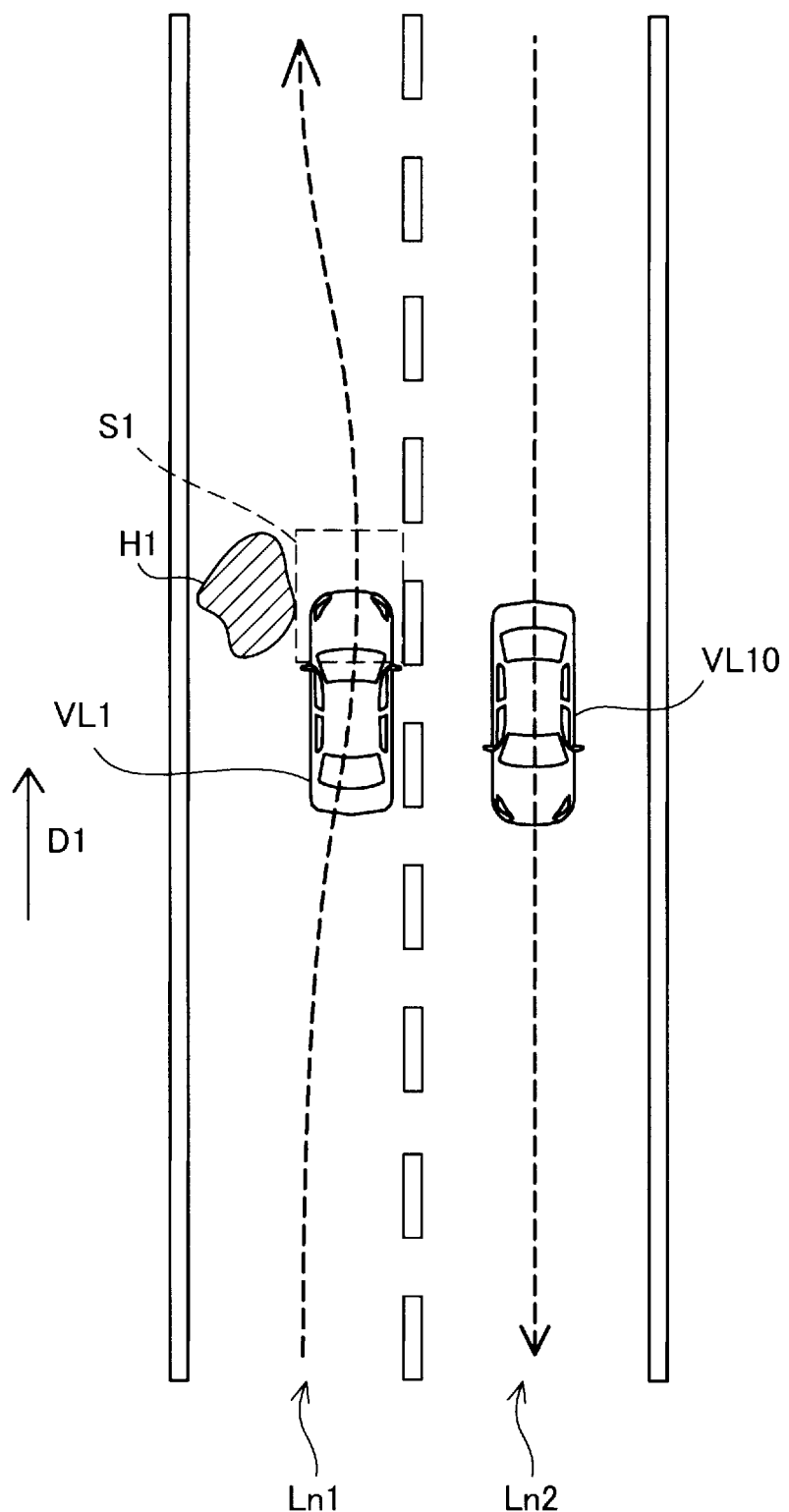
FIG. 4 is an explanatory diagram illustrating an example of a trajectory of the own vehicle that avoids a passage acceptable obstacle by steering.

If step S125 is executed, as shown in FIG. 4, the own vehicle VL1 travels along the trajectory that goes beyond the puddle H1 by passing through the space S1 next to the puddle HE In this case, the own vehicle VL1 travels without steering into the opposite lane Ln2. Thus, the oncoming vehicle VL10 can keep traveling straight ahead in the opposite lane Ln2. It is possible to suppress the influence on the surrounding traffic caused by the avoidance maneuver of the own vehicle VL1. In FIG. 4, the trajectory of the own vehicle VL1 and the trajectory of the oncoming vehicle VL10 are shown by broken arrows.

If it is determined that there is no enough space for steering the vehicle to thereby avoid the obstacle (step S120: NO), the traffic condition determining section 14 determines whether there is an oncoming vehicle (step S130). If it is determined that there is an oncoming vehicle (step S130: YES), the control instructing section 11 instructs the maneuver controller 200 to stop the own vehicle short of the detected obstacle (step S135). Thus, in this case, the own vehicle stops short of the obstacle. After executing step S135, the process returns to the above-described step S130. In contrast, if it is determined that there is no oncoming vehicle (step S130: NO), the above-described step S125 is executed to perform the avoidance maneuver.

Figure 5:
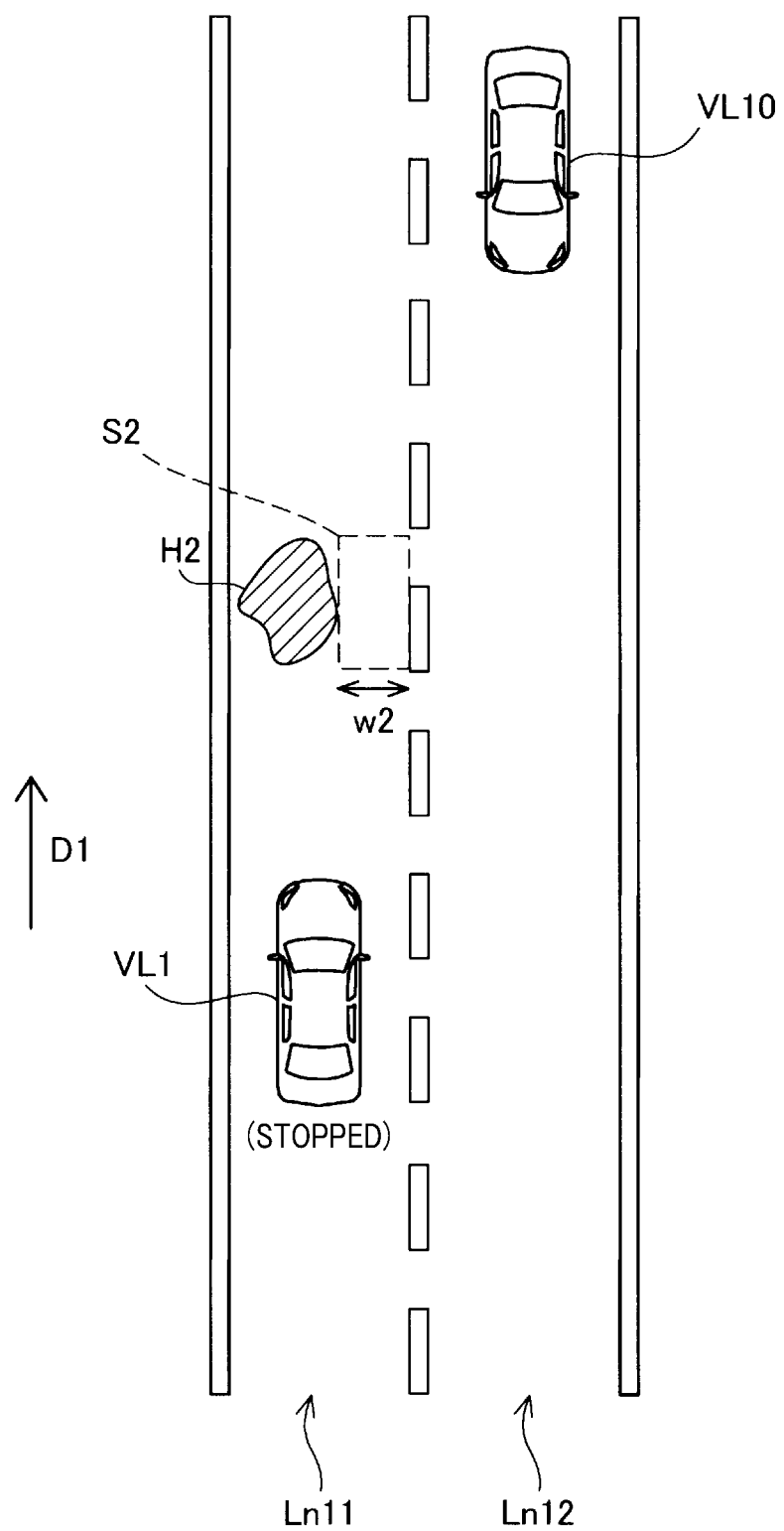
FIG. 5 is an explanatory diagram illustrating an example of the own vehicle that is stopped.
Figure 6:
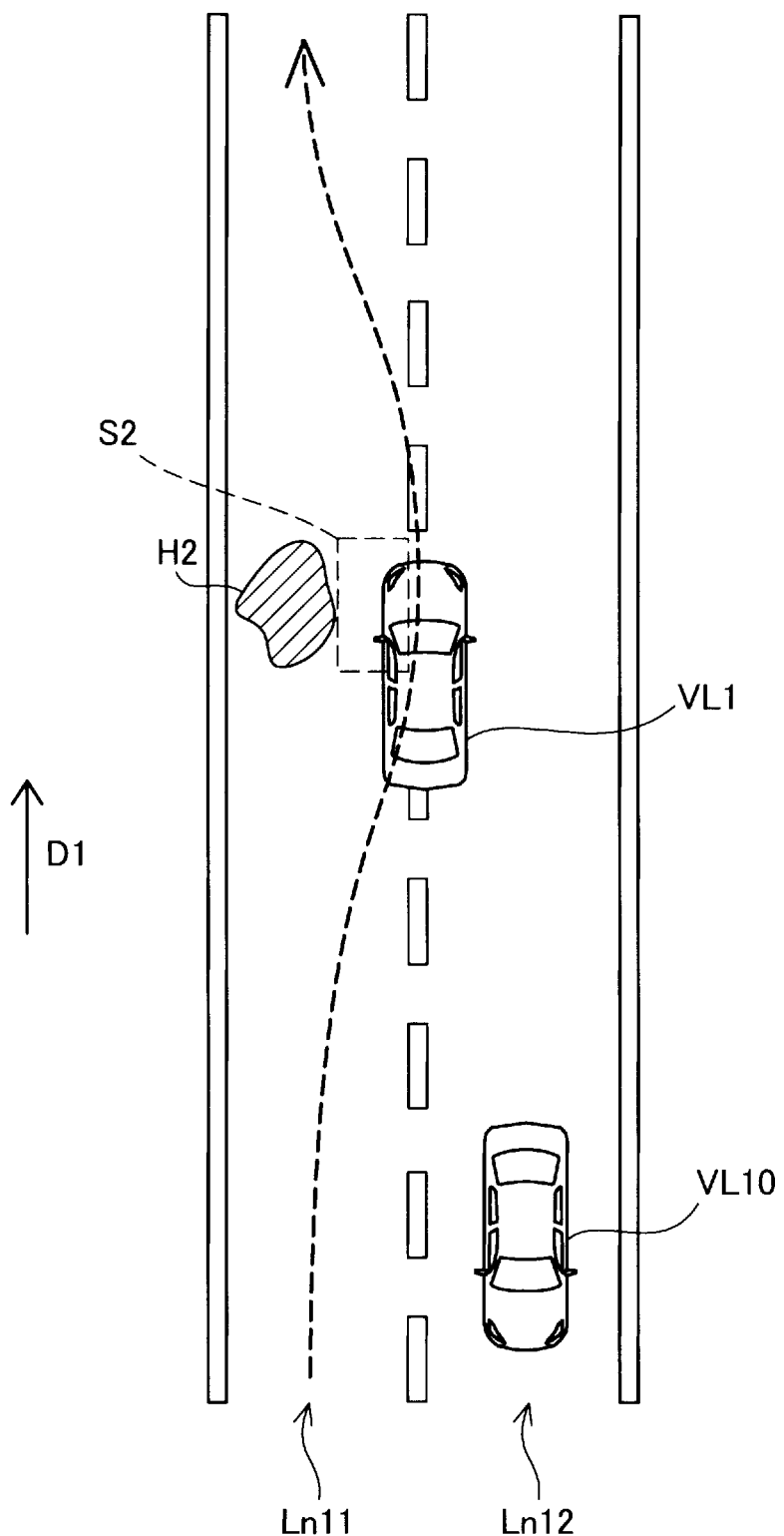
FIG. 6 is an explanatory diagram illustrating an example of a trajectory of the own vehicle that avoids the passage acceptable obstacle by steering.

FIG. 5 shows a state in which the own vehicle VL1 is traveling straight on the lane Ln11 in the direction D1. In this state, if there is a puddle H2 ahead on the planned driving path, that is, on the lane Ln11, and a length w2 of a space S2 next to the puddle H2 in the direction orthogonal to the direction D1 is less than the width of the own vehicle VL1, and there is the oncoming vehicle VL10 on an opposite lane Ln12, the own vehicle VL1 stops short of the puddle H2. Subsequently, after some time has elapsed from when the oncoming vehicle VL10 passed beside the puddle H2, at step S130, it is determined that there is no oncoming vehicle. As a result, as shown in FIG. 6, the own vehicle VL1 avoids and passes the puddle H2. At this time, although the own vehicle VL1 steers into the opposite lane Ln12, since there is no oncoming vehicle, the influence on the surrounding traffic is suppressed.

As shown in FIG. 2, at step S115, if it is determined that the obstacle is the passage acceptable obstacle (step S115: YES), the traffic condition determining section 14 determines whether there is enough space for steering the vehicle to thereby avoid the obstacle in the vicinity of the obstacle on the planned driving path (step S140). Since step S140 is the same process as the above-described step S120, the detailed description will be omitted.

If it is determined that there is enough space for steering the vehicle to thereby avoid the obstacle (step S140: YES), the above-described step S125 is executed to perform the avoidance maneuver. In contrast, if it is determined that there is no enough space for steering the vehicle to thereby avoid the obstacle (step S140: NO), the traffic condition determining section 14 determines the trajectory of the preceding vehicle (step S145). The traffic condition determining section 14 determines whether the determined trajectory of the preceding vehicle is a trajectory that passes over the obstacle (passage acceptable obstacle) (step S150). If it is determined that the trajectory of the preceding vehicle is the trajectory that passes the obstacle (step S150: YES), the control instructing section 11 instructs the maneuver controller 200 to pass over the detected obstacle (passage acceptable obstacle) (step S170). Thus, in this case, the own vehicle passes over the obstacle. In this manner, even if it is determined that the obstacle is the passage acceptable obstacle, the own vehicle is controlled to pass over the obstacle after checking that the trajectory of the preceding vehicle is the one that passes over the obstacle. Thus, the own vehicle is controlled to pass over the obstacle when there is a high possibility that the influence is small even if the own vehicle comes into contact with the obstacle. In the present embodiment, if the trajectory of the preceding vehicle is not determined since there is no preceding vehicle, it is determined that the trajectory of the preceding vehicle is a trajectory that passes over the obstacle. Conversely, if the trajectory of the preceding vehicle is not determined since there is no preceding vehicle, it may be determined that the trajectory of the preceding vehicle is not a trajectory that passes over the obstacle.

If it is determined that the trajectory of the preceding vehicle is not a trajectory that passes the obstacle (passage acceptable obstacle) (step S150: NO), the traffic condition determining section 14 determines whether there is an oncoming vehicle (step S155). Since step S155 is the same process as the above-described step S130, the detailed description will be omitted.

If it is determined that there is no oncoming vehicle (step S155: NO), the control instructing section 11 instructs the maneuver controller 200 to steer the own vehicle to thereby avoid the detected obstacle (step S160). Thus, in this case, the own vehicle overtakes the obstacle to thereby avoid obstacle.

In contrast, if it is determined that there is an oncoming vehicle (step S155: YES), the traffic condition determining section 14 determines whether there is a following vehicle on the driving lane behind the own vehicle (step S165).

If it is determined that there is no following vehicle (step S165: NO), the control instructing section 11 instructs the maneuver controller 200 to stop the own vehicle (step S175). Thus, in this case, the own vehicle stops. In contrast, if it is determined that there is the following vehicle (step S165: YES), the above-described step S170 is executed, and the own vehicle passes over the obstacle.

After the above-described step S125 (steering avoidance instruction), S160 (steering avoidance instruction), S170 (passage instruction), or S175 (stop instruction) is executed, the process returns to step S105.

Figure 7:
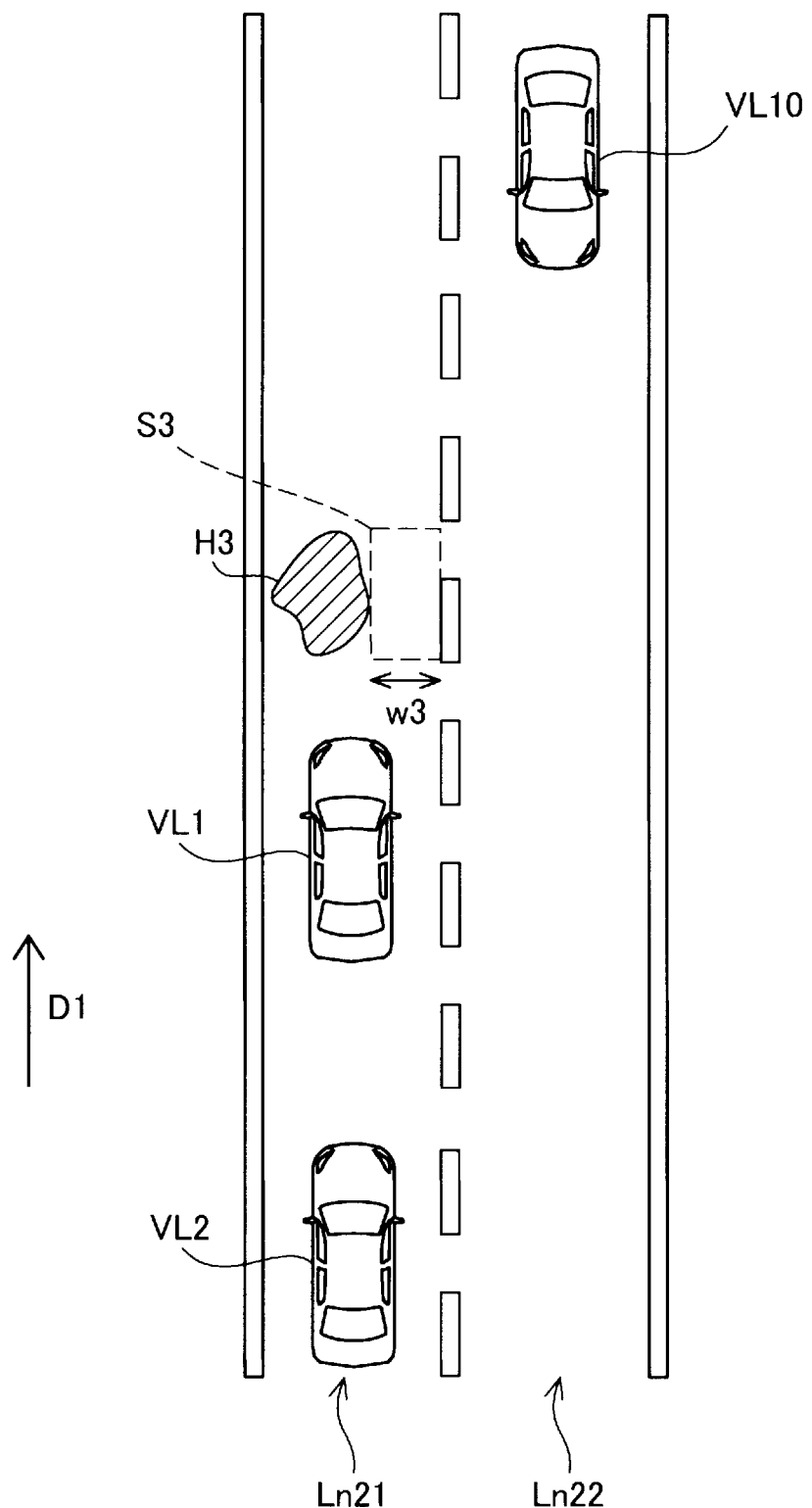
FIG. 7 is an explanatory diagram illustrating an example of the manner in which the own vehicle travels when there are an oncoming vehicle and a following vehicle.
Figure 8:
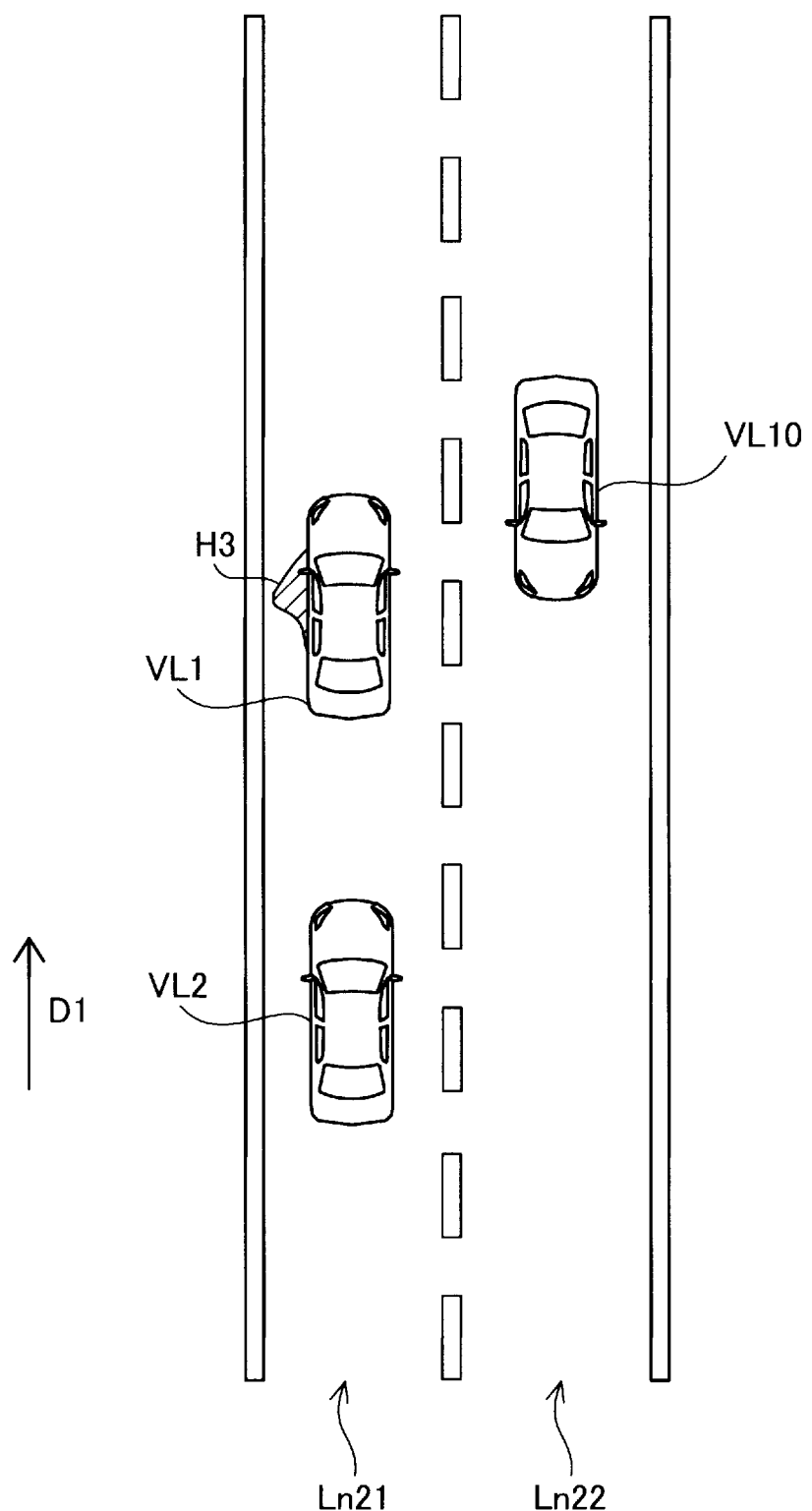
FIG. 8 is an explanatory diagram illustrating an example of the manner in which the own vehicle travels when there are the oncoming vehicle and the following vehicle.

FIG. 7 shows a state in which the own vehicle VL1 is traveling straight on a lane Ln21 in the direction D1. In this state, if there is a puddle H3 ahead of the planned driving path, that is, the lane Ln21, and a length w3 of a space S3 in the direction orthogonal to the direction D1 next to the puddle H3 is less than the width of the own vehicle VL1, and there is the oncoming vehicle VL10 on an opposite lane Ln22, and there is a following vehicle VL2 on the lane Ln21, the above-described step S170 is executed. Thus, as shown in FIG. 8, the own vehicle VL1 passes the puddle H3. In the situation shown in FIG. 7, if there is no following vehicle VL2, it is the same situation as that shown in FIG. 5. Thus, in this case, the own vehicle VL1 stops (step S175). Subsequently, since it is determined that there is no oncoming vehicle at step S155, step S160 is executed to perform the avoidance maneuver by steering.

According to the autonomous driving control apparatus 10 of the first embodiment described above, since the control instructing section 11 may give an instruction of control to pass over the obstacle (execute step S170) if the obstacle on the planned driving path is determined to be the passage acceptable obstacle, the avoidance maneuver is inhibited from being performed although the obstacle is the kind of obstacle that has a small influence even if the vehicle comes into contact while passing. It is possible to suppress the influence on the occupant and the surrounding traffic when the vehicle travels beyond the obstacle on the path.

If it is determined that the obstacle on the planned driving path is the passage acceptable obstacle and that the traffic condition satisfies the predetermined conditions (step S150: YES, or step S155: YES and step S165: YES), the control instructing section 11 gives an instruction of control to pass over the obstacle. Thus, when the vehicle travels beyond the obstacle on the path, the influence on the surrounding traffic is more reliably limited.

Furthermore, since the own vehicle passes over an obstacle (passage permissible obstacle) on the planned driving path if the trajectory of the preceding vehicle is the trajectory that has passed the obstacle (step S150: YES), the influence on the occupant is more reliably limited when the own vehicle travels beyond the obstacle on the road. This is because if the trajectory of the preceding vehicle is the trajectory that has passed over the obstacle, there is a small influence even if the vehicle comes into contact with the obstacle.

If it is determined that an obstacle on the planned driving path is the passage acceptable obstacle (step S115: YES) and that there is an oncoming vehicle (step S155: YES), the control instructing section 11 instructs to pass beyond the obstacle (step S170) or to stop (step S175). Thus, the own vehicle is inhibited from causing the oncoming vehicle to steer or to apply brakes suddenly. It is possible to suppress the influence on the surrounding traffic when the own vehicle travels beyond the obstacle on the path.

Even if the preceding vehicle did not pass over the obstacle, the passage instruction is made (step S170) only when the following conditions are satisfied. That is, there is an oncoming vehicle (step S155: YES), and there is no enough space for steering the vehicle to thereby avoid the obstacle on the lane of the planned driving path (step S140: NO). It is possible to suppress the influence on the own vehicle when the own vehicle passes over the obstacle while limiting the influence on the surrounding traffic when the own vehicle travels beyond an obstacle on the path.

When there is enough space for steering the vehicle to thereby avoid the obstacle on the lane of the planned driving path (step S120: YES, or step S140: YES), the vehicle avoids the obstacle on the planned driving path by steering. It is possible to suppress the influence on the surrounding traffic while limiting the influence on the own vehicle when the own vehicle passes over the obstacle.

If it is determined that an oncoming vehicle is not travelling on the oncoming lane (step S155: NO), the control instructing section 11 gives an instruction of control to avoid an obstacle on the planned driving path by steering (step S160). It is possible to suppress the influence on the own vehicle when the own vehicle passes over the obstacle.

If there is a following vehicle, the own vehicle passes over the obstacle (step S170). This inhibits the own vehicle from influencing the following vehicle by decelerating or stopping although there is the following vehicle.

B. Second Embodiment

An autonomous driving control apparatus of the second embodiment differs from the autonomous driving control apparatus 10 of the first embodiment in that the trajectory determining section 15 is not provided. Since other structures of the autonomous driving control apparatus of the second embodiment are the same as those of the autonomous driving control apparatus 10 of the first embodiment, the same components are given the same reference numerals, and the detailed descriptions will be omitted.

As shown in FIG. 9, an autonomous driving control process of the second embodiment differs from the autonomous driving control process of the first embodiment shown in FIG. 2 in that steps S140, S145, S150, S155, S160, S165, and S175 are omitted. Since other procedures of the autonomous driving control process of the second embodiment are the same as those of the autonomous driving control process of the first embodiment, the same procedures are given the same reference numerals, and the detailed descriptions will be omitted.

As shown in FIG. 9, at step S115, if it is determined that an obstacle is the passage acceptable obstacle (step S115: YES), the above-described step S170 is executed. Thus, in this case, the own vehicle passes over the obstacle. The process when it is determined that an obstacle is not the passage acceptable obstacle (step S115: NO) is the same as that in the first embodiment.

The autonomous driving control apparatus 10 of the second embodiment configured as described above has the same advantages as the autonomous driving control apparatus 10 of the first embodiment.

C. Third Embodiment

An autonomous driving control apparatus of the third embodiment differs from the autonomous driving control apparatus 10 of the first embodiment in that the trajectory determining section 15 is not provided. Since other structures of the autonomous driving control apparatus of the third embodiment are the same as those of the autonomous driving control apparatus 10 of the first embodiment, the same components are given the same reference numerals, and the detailed descriptions will be omitted.

As shown in FIG. 10, an autonomous driving control process of the third embodiment differs from the autonomous driving control process of the first embodiment shown in FIG. 2 in that steps S145 and S150 are omitted. Since other procedures of the autonomous driving control process of the third embodiment are the same as those of the autonomous driving control process of the first embodiment, the same procedures are given the same reference numerals, and the detailed descriptions will be omitted.

As shown in FIG. 10, at step S115, if it is determined that the obstacle is the passage acceptable obstacle (step S115: YES), the above-described step S140 is executed.

The autonomous driving control apparatus 10 of the third embodiment configured as described above has the same advantages as the autonomous driving control apparatus 10 of the first embodiment.

D. Fourth Embodiment

Since an autonomous driving control apparatus 10 of the fourth embodiment is the same as the autonomous driving control apparatus 10 of the first embodiment, the same components are given the same reference numerals, and the detailed descriptions will be omitted.

As shown in FIG. 11, an autonomous driving control process of the fourth embodiment differs from the autonomous driving control process of the first embodiment shown in FIG. 2 in that steps S155, S160, S165, and S175 are omitted. Since other procedures of the autonomous driving control process of the fourth embodiment are the same as those of the autonomous driving control process of the first embodiment, the same procedures are given the same reference numerals, and the detailed descriptions will be omitted.

As shown in FIG. 11, at step S150, if it is determined that the trajectory of the preceding vehicle does not pass over the obstacle (passage acceptable obstacle) (step S150: NO), the above-described step S125 is executed. Thus, in this case, the own vehicle steers into the adjacent lane or the opposite lane to avoid the obstacle and travel beyond the obstacle.

The autonomous driving control apparatus 10 of the fourth embodiment configured as described above has the same advantages as the autonomous driving control apparatus 10 of the first embodiment.

E. Fifth Embodiment

Since an autonomous driving control apparatus 10 of the fifth embodiment is the same as the autonomous driving control apparatus 10 of the first embodiment, the same components are given the same reference numerals, and the detailed descriptions will be omitted.

As shown in FIG. 12, an autonomous driving control process of the fifth embodiment differs from the autonomous driving control process of the first embodiment shown in FIG. 2 in that step S140 is omitted. Since other procedures of the autonomous driving control process of the fifth embodiment are the same as those of the autonomous driving control process of the first embodiment, the same procedures are given the same reference numerals, and detailed description will be omitted.

As shown in FIG. 12, at step S150, if it is determined that the trajectory of the preceding vehicle is not the trajectory that passes over the obstacle (passage acceptable obstacle) (step S150: NO), the above-described step S155 is executed.

The autonomous driving control apparatus 10 of the fifth embodiment configured as described above has the same advantages as the autonomous driving control apparatus 10 of the first embodiment.

F. Sixth Embodiment

Since an autonomous driving control apparatus 10 of the sixth embodiment is the same as the autonomous driving control apparatus 10 of the first embodiment, the same components are given the same reference numerals, and detailed description will be omitted.

As shown in FIG. 13, an autonomous driving control process of the sixth embodiment differs from the autonomous driving control process of the first embodiment shown in FIG. 2 in that step S125a is executed instead of step S125. Since other procedures of the autonomous driving control process of the sixth embodiment are the same as those of the autonomous driving control process of the first embodiment, the same procedures are given the same reference numerals, and detailed description will be omitted.

As shown in FIG. 13, if it is determined that there is enough space for steering the vehicle to thereby avoid the obstacle on the lane of the planned driving path (step S120: YES, or step S140: YES), or if it is determined that there is no oncoming vehicle (step S130: NO), the control instructing section 11 instructs the maneuver controller 200 to pass over the detected obstacle (passage acceptable obstacle) (step S125a). Since step S125a is the same process as the above-described step S170, detailed description will be omitted.

The autonomous driving control apparatus 10 of the sixth embodiment configured as described above has the same advantages as the autonomous driving control apparatus 10 of the first embodiment. Additionally, even if it is determined that there is enough space for steering the vehicle to thereby avoid the obstacle on the lane of the planned driving path, the control instructing section 11 gives an instruction of control to pass over the obstacle. Thus, as viewed from an occupant of the oncoming vehicle, the situation in which a vehicle seems to be approaching his or her own vehicle is avoided. This prevents the oncoming vehicle from performing an unnecessary avoidance maneuver and limits the influence on the surrounding traffic. Moreover, since the control instructing section 11 gives an instruction of control to pass over the obstacle although there is no oncoming vehicle, as viewed from an occupant of the oncoming vehicle at a position away from the own vehicle by a predetermined distance, the situation in which the own vehicle seems to be approaching the driving lane of his or her own vehicle is avoided. This inhibits causing unnecessary stress to the occupant of the oncoming vehicle.

G. Seventh Embodiment

Since an autonomous driving control apparatus 10 of the seventh embodiment is the same as the autonomous driving control apparatus 10 of the first embodiment, the same components are given the same reference numerals, and detailed description will be omitted.

As shown in FIG. 14, an autonomous driving control process of the seventh embodiment differs from the autonomous driving control process of the first embodiment shown in FIG. 2 in that step S160a is executed instead of step S160. Since other procedures of the autonomous driving control process of the seventh embodiment are the same as those of the autonomous driving control process of the first embodiment, the same procedures are given the same reference numerals, and detailed description will be omitted.

As shown in FIG. 14, at step S155, if it is determined that there is no oncoming vehicle (step S155: NO), the control instructing section 11 instructs the maneuver controller 200 to pass over the detected obstacle (passage acceptable obstacle) (step S160a). Since step S160a is the same process as the above-described step S170, detailed description will be omitted.

The autonomous driving control apparatus 10 of the seventh embodiment configured as described above has the same advantages as the autonomous driving control apparatus 10 of the first embodiment. Additionally, since the control instructing section 11 gives an instruction of control to pass over the obstacle although there is no oncoming vehicle, as viewed from an occupant of the oncoming vehicle at a position away from the own vehicle by a predetermined distance, the situation in which the own vehicle seems to be approaching the driving lane of his or her own vehicle is avoided. This inhibits causing unnecessary concern to the occupant of the oncoming vehicle.

H. Eighth Embodiment

Since an autonomous driving control apparatus 10 of the eighth embodiment is the same as the autonomous driving control apparatus 10 of the first embodiment, the same components are given the same reference numerals, and detailed description will be omitted.

As shown in FIG. 15, an autonomous driving control process of the eighth embodiment differs from the autonomous driving control process of the first embodiment shown in FIG. 2 in that step S165 is omitted. Since other procedures of the autonomous driving control process of the eighth embodiment are the same as those of the autonomous driving control process of the first embodiment, the same procedures are given the same reference numerals, and detailed description will be omitted.

As shown in FIG. 15, at step S155, if it is determined that there is an oncoming vehicle (step S155: YES), the above-described step S175 is executed. Thus, in this case, the own vehicle stops.

The autonomous driving control apparatus 10 of the eighth embodiment configured as described above has the same advantages as the autonomous driving control apparatus 10 of the first embodiment.

I. Other Embodiments

I1. First Modification

In each of the embodiments, when instructing the maneuver controller 200 to pass over the passage acceptable obstacle (step S170, S125a, and S160a), the control instructing section 11 may also issue instructions to reduce the vehicle speed. In this case, for example, the vehicle speed may be reduced to 10 km per hour or less to pass over the obstacle slowly. It is possible to suppress the influence on the own vehicle and the surroundings caused by passing over the obstacle including splashing muddy water while passing a puddle and getting the muddy water on the surrounding passersby, the oncoming vehicle, or the own vehicle.

I2. Second Modification

In each of the embodiments, the processes for determining whether an obstacle is on the planned driving path and the kind of the obstacle, determining whether there is enough space for steering the vehicle to thereby avoid the obstacle on the lane of the planned driving path, determining the trajectory of a preceding vehicle, determining whether an oncoming vehicle is traveling, and determining whether a following vehicle is traveling are executed by the autonomous driving control apparatus 10 on the basis of the measurement values obtained by the various sensors 21 to 28 located on the own vehicle. However, the present disclosure is not limited to this configuration. The processes may be executed by an apparatus different from the own vehicle. The own vehicle may acquire the results of the processes, that is, the determination results and execute the subsequent processes in accordance with the results of the processes. In addition to the determination results, the instructions of each control subsequently performed (step S125 (steering avoidance instruction), S125a (passage instruction), S160 (steering avoidance instruction), S160a (passage instruction), S170 (passage instruction), or S175 (stop instruction) may be made by the apparatus different from the own vehicle. The apparatus different from the own vehicle may be, for example, the autonomous driving control apparatus mounted on another vehicle or a server in the control system. In these examples, the own vehicle is configured as what is called a connected car and communicates with another vehicle or the server in the control system through vehicle-to-vehicle communication or road-to-vehicle communication.

I3. Third Modification

In each of the embodiments, the own vehicle is a vehicle that is equipped with an engine, but may be a vehicle that is not equipped with an engine such as an electric automobile. The own vehicle is a vehicle that is capable of selectively executing the autonomous driving and the manual driving, but may be a vehicle that performs only the autonomous driving. With this configuration, step S105 of the autonomous driving control process may be omitted.

I4. Fourth Modification

The configuration described in each of the embodiments may be partially omitted or changed. The routine of an autonomous driving control process of each of the embodiments may be partially omitted or the order of execution may be changed. In each of the embodiments, part of the configuration achieved by hardware may be replaced with software. Conversely, part of the configuration achieved by software may be replaced with hardware. For example, at least one of the functional units including the control instructing section 11, the path determining section 12, the obstacle determining section 13, the traffic condition determining section 14, the trajectory determining section 15, and the collision estimating section 16 may be achieved by an integrated circuit, a discrete circuit, or a module constituted by combining these circuits. If some or all of the functions of the present disclosure are achieved by software, the software (computer programs) is provided in the form stored in a computer-readable storage medium. The computer-readable storage medium includes not only a portable storage medium such as a flexible disk and a CD-ROM, but also various internal storage devices in a computer such as RAM and ROM and external storage devices fixed to the computer such as a hard disk. That is, the computer-readable storage medium has wide meaning including any non-transitory storage medium that is capable of storing data packets.

The present invention is not limited to the above embodiments, and various modifications are possible without departing from the scope of the disclosure. For example, technical characteristics in each embodiment corresponding to the technical characteristics of each aspect disclosed in Summary of the Invention may be replaced or combined as required to solve some or all of the above-described problems or to achieve some or all of the above-described advantages. If the technical characteristics are not described as essential in this specification, the technical characteristics may be omitted as required.

What is claimed is:

1. An autonomous driving control apparatus installable in a vehicle, comprising:
    a path determining section that determines a planned driving path of the vehicle;
    an obstacle determining section that determines whether an obstacle on the planned driving path is a passage acceptable obstacle or a passage unacceptable obstacle, the passage acceptable obstacle being previously set as an obstacle that the vehicle is allowed to come into contact with while passing, the passage unacceptable obstacle being previously set as an obstacle that the vehicle is not allowed to come into contact with while passing;
    a traffic condition determining section that determines a traffic condition surrounding the vehicle, the traffic condition including:
        whether an oncoming vehicle is traveling on an oncoming lane that is opposite to a lane of the planned driving path on which the vehicle is traveling; and
        whether there is enough space for steering the vehicle to thereby avoid the obstacle on the lane of the planned driving path; and
    a control instruction section that gives an instruction of control to a maneuver controller to perform at least one of controlling a speed of the vehicle and controlling a steering of the vehicle to thereby pass over the obstacle on the planned driving path upon:
        the obstacle, at least part of which is located on the lane of the planned driving path, being a passage acceptable obstacle; and
        the traffic condition satisfying, as a predetermined condition, both
            a first condition that an oncoming vehicle is traveling on the oncoming lane, and
            a second condition that there is not enough space for steering the vehicle to thereby avoid the obstacle on the lane of the planned driving path.

2. The autonomous driving control apparatus according to claim 1, further comprising a trajectory determining section that determines a trajectory of a preceding vehicle of the vehicle, wherein
    the predetermined condition includes that the determined trajectory is a trajectory that has passed the obstacle on the planned driving path.

3. The autonomous driving control apparatus according to claim 2, wherein
    the traffic condition determining section further determines whether a following vehicle is traveling on the lane of the planned driving path on which the vehicle is traveling, and
    the predetermined condition includes that a following vehicle is traveling on the lane of the planned driving path on which the vehicle is traveling.

4. The autonomous driving control apparatus according to claim 1, wherein, when it is determined that there is enough space, the control instructing section gives an instruction of the control to steer the vehicle to thereby avoid the obstacle on the planned driving path.

5. The autonomous driving control apparatus according to claim 1, wherein, when it is determined that there is no oncoming vehicle travelling on the oncoming lane, the control instructing section gives an instruction of the control to steer the vehicle to thereby avoid the obstacle on the planned driving path.

6. The autonomous driving control apparatus according to claim 1, wherein
    the traffic condition determining section further determines whether a following vehicle is traveling on the lane of the planned driving path on which the vehicle is traveling,
    when it is determined that an oncoming vehicle is travelling on the oncoming lane and there is no following vehicle traveling on the lane of the planned driving path, the control instructing section gives an instruction of the control to stop the vehicle,
    after the vehicle is stopped, the traffic condition determining section determines whether an oncoming vehicle is travelling on the oncoming lane and a following vehicle is traveling on the lane of the planned driving path,
    when it is determined that there is no oncoming vehicle travelling on the oncoming lane, the control instructing section gives an instruction of the control to steer the vehicle to thereby avoid the obstacle on the planned driving path, and
    the predetermined condition includes that an oncoming vehicle is travelling on the oncoming lane and a following vehicle is traveling on the lane of the planned driving path.

7. An autonomous driving control method for a vehicle, comprising:
    determining a planned driving path of the vehicle;
    determining whether an obstacle on the planned driving path is a passage acceptable obstacle or a passage unacceptable obstacle, the passage acceptable obstacle being previously set as an obstacle that the vehicle is allowed to come into contact with while passing, the passage unacceptable obstacle being previously set as an obstacle that the vehicle is not allowed to come into contact with while passing;

determining a traffic condition surrounding the vehicle, the traffic condition including:

whether an oncoming vehicle is traveling on an oncoming lane that is opposite to a lane of the planned driving path on which the vehicle is traveling; and whether there is enough space for steering the vehicle to thereby avoid the obstacle on the lane of the planned driving path; and instructing a maneuver control apparatus to perform at least one of controlling a speed of the vehicle and controlling a steering of the vehicle to thereby pass over the obstacle on the planned driving path upon:

the obstacle, at least part of which is located on the lane of the planned driving path, being a passage acceptable obstacle; and the traffic condition satisfying, as a predetermined condition, both a first condition that an oncoming vehicle is traveling on the oncoming lane, and a second condition that there is not enough space for steering the vehicle to thereby avoid the obstacle on the lane of the planned driving path.

* * * * *